United States Patent
Thomas et al.

(10) Patent No.: US 11,182,502 B2
(45) Date of Patent: Nov. 23, 2021

(54) SYSTEMS AND METHODS FOR COMPUTING DATA PRIVACY-UTILITY TRADEOFF

(71) Applicant: Tata Consultancy Services Limited, Mumbai (IN)

(72) Inventors: Dilys Thomas, Pune (IN); Sachin Premsukh Lodha, Pune (IN); Kalyani Mashiwal, Pune (IN); Vijayanand Mahadeo Banahatti, Pune (IN); Kishore Padmanabhan, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 116 days.

(21) Appl. No.: 16/078,577

(22) PCT Filed: Feb. 20, 2017

(86) PCT No.: PCT/IB2017/050950
§ 371 (c)(1),
(2) Date: Aug. 21, 2018

(87) PCT Pub. No.: WO2017/145038
PCT Pub. Date: Aug. 31, 2017

(65) Prior Publication Data
US 2019/0057225 A1    Feb. 21, 2019

(30) Foreign Application Priority Data
Feb. 22, 2016  (IN) .............................. 201621006136

(51) Int. Cl.
*G06F 21/62* (2013.01)
*H04L 29/06* (2006.01)
(Continued)

(52) U.S. Cl.
CPC ......... *G06F 21/6254* (2013.01); *G06N 5/045* (2013.01); *G06N 20/00* (2019.01);
(Continued)

(58) Field of Classification Search
CPC . G06F 21/6245; H04L 63/0421; H04W 12/02
See application file for complete search history.

(56) References Cited

U.S. PATENT DOCUMENTS 8,024,339 B2 *  9/2011  Barker ................ G06F 21/6245
                                          707/736
8,112,422 B2    2/2012  Srivastava et al.
(Continued)

FOREIGN PATENT DOCUMENTS

EP          2922268        9/2015
WO      WO-2012/100331     8/2012
WO      WO 2014/049605 A1 * 4/2014  ............. G06F 21/62

OTHER PUBLICATIONS

International Search Report dated Jun. 9, 2017, in corresponding International Application No. PCT/IB2017/050950; 2 pages.
(Continued)

*Primary Examiner* — Jason Chiang
(74) *Attorney, Agent, or Firm* — Finnegan, Henderson, Farabow, Garrett & Dunner, LLP

(57) ABSTRACT

Systems and methods for computing data privacy-utility tradeoff is disclosed. Large data hubs like data marketplace are a source of data that may be of utility to data buyers. However, output data provided to data sellers is required to meet the privacy requirements of data sellers and at the same time maintain a level of utility to data buyers. Conventionally known methods of achieving data privacy tend to suppress components of data that may result in reduced utility of the data. Systems and methods of the present
(Continued)

disclosure compute this tradeoff to establish need for data transformation, if any, before data is shared with data sellers.

15 Claims, 11 Drawing Sheets

(51) Int. Cl.
*H04W 12/02* (2009.01)
*G06N 20/00* (2019.01)
*G06N 5/04* (2006.01)

(52) U.S. Cl.
CPC ......... *H04L 63/0421* (2013.01); *H04W 12/02* (2013.01); *H04L 2209/046* (2013.01); *H04L 2209/42* (2013.01)

(56) References Cited

U.S. PATENT DOCUMENTS

| | | | |
|---|---|---|---|
| 9,230,132 B2 | 1/2016 | Gkoulalas-Divanis et al. | |
| 9,609,025 B1* | 3/2017 | Betzler | H04L 63/0263 |
| 10,339,341 B2* | 7/2019 | Mushkatblat | G06F 21/6245 |
| 2008/0133935 A1 | 6/2008 | Elovici et al. | |
| 2008/0282096 A1* | 11/2008 | Agrawal | G06F 21/6245 713/193 |
| 2010/0185847 A1 | 7/2010 | Shasha et al. | |
| 2011/0153351 A1* | 6/2011 | Vesper | G06Q 50/22 705/2 |
| 2012/0030165 A1* | 2/2012 | Guirguis | G06F 9/466 707/607 |
| 2014/0046777 A1* | 2/2014 | Markey | G06Q 30/02 705/14.66 |
| 2015/0161397 A1* | 6/2015 | Cook | G06F 21/6254 726/26 |
| 2015/0220625 A1* | 8/2015 | Cartmell | H04L 63/308 707/754 |
| 2015/0269391 A1* | 9/2015 | Ukil | G06F 21/6254 726/30 |
| 2015/0379303 A1 | 12/2015 | LaFever et al. | |
| 2016/0092699 A1* | 3/2016 | Riva | H04L 67/22 726/26 |
| 2016/0094343 A1* | 3/2016 | Ladak | H04L 9/0861 380/28 |

OTHER PUBLICATIONS

Written Opinion dated Jun. 9, 2017, in corresponding International Application No. PCT/IB2017/050950; 9 pages.

* cited by examiner

A=[1, 2, 3, 4, 5, 7, 8]
A'=[0, 3, 3, 4, 5, 7, 8]
A'=[0, 0, 6, 4, 5, 7, 8]
A'=[0, 0, 0, 10, 5, 7, 8]
A'=[0, 0, 0, 10, 0, 12, 8]

A'=[0, 0, 0, 10, 0, 0, 20] ⟹ Balanced Entity Count

A'=[15, 0, 0, 0, 0, 15, 0] ⟹ Balanced Entity Count

FIG.10B

SYSTEMS AND METHODS FOR COMPUTING DATA PRIVACY-UTILITY TRADEOFF

PRIORITY CLAIM

This application is a U.S. National Stage Filing under 35 U.S.C. § 371 and claims priority from International Application No. PCT/IB2017/050950, filed on Feb. 20, 2017, which application claims priority under 35 U.S.C. § 119 from Indian Application No. 201621006136, filed on Feb. 22, 2016. The entire contents of the aforementioned application are incorporated herein by reference.

TECHNICAL FIELD

The embodiments herein generally relate to information security, and more particularly to systems and methods for assessing tradeoff between privacy and utility of data.

BACKGROUND

Privacy is generally a state of being free from public attention or a state in which one is not observed or disturbed by other people. When sensitive data from distributed sources are linked, privacy threats have to be considered. In this age of globalization, organizations may need to publish micro-data with business associates in order to remain competitive. This puts personal privacy at risk. Again, today dependency of people on smartphones and tablets is huge. These devices contain a lot of personal information due to the huge number of operations that they can perform. People access their bank accounts, make purchases, and pay bills making such devices a potential target for cyber criminals. Behavioral aspects also add to privacy risks. People aren't always aware of who is tracking them and how the tracked information will be used. Preventing identity theft is therefore one of the top priorities for most sectors including health, finance, government, manufacturing, banking, retail business, insurance, outsourcing.

To surmount privacy risk, traditionally, attributes which clearly identify individuals, such as name, social security number, driving license number, and the like are generally removed or suppressed by random values. For example, consider the following tables which are part of a medical database. Table (a) is related to micro data and Table (b) is related to public data or voting registration data.

TABLE (a)

Medical data (Micro data)

| Gender | Date of Birth | Zipcode | Disease |
|---|---|---|---|
| male | 21/7/79 | 52000 | Flu |
| female | 10/1/81 | 43000 | Hepatitis |
| female | 1/10/44 | 32000 | Bronchitis |
| male | 21/2/84 | 27000 | Sprained Ankle |
| female | 19/4/72 | 41000 | Dyspepsia |

TABLE (b)

Voting registration data (public)

| Name | Gender | Date of Birth | Zipcode |
|---|---|---|---|
| Andre | male | 21/7/79 | 52000 |
| Beth | female | 10/1/81 | 43000 |
| Carol | female | 1/10/44 | 32000 |
| Dan | male | 21/2/84 | 27000 |
| Ellen | female | 19/4/72 | 41000 |

The attribute Disease of Table (a) is a sensitive attribute. An attribute is called sensitive, if the individual is not willing to disclose the attribute or an adversary must not be allowed to discover the value of that attribute. The collection of attributes {Gender, Date of Birth and Zipcode} is called Quasi Identifier (QI) attributes; by linking the QI attributes of these two tables an adversary can identify attribute Name from the Voting registration data. The sensitive attributes are not sensitive by themselves, but certain values or their combinations may be linked to external knowledge to reveal indirect sensitive information of an individual. Quasi-identifiers can thus, when combined, become personally identifying information. Quasi-identifiers have been the basis of several attacks on released data. It is therefore critical to be able to recognize quasi-identifiers and to apply to them appropriate protective measures to mitigate the identity disclosure risk.

If a natural join is applied to Table (c) having suppressed medical data and Table (b) above, it may be easy to re-identify individuals with the help of quasi-identifiers as explained herein below.

TABLE (c)

Suppressed medical data (micro data)

| Gender | Date of Birth | Zipcode | Disease |
|---|---|---|---|
| male | * | 52* | Flu |
| female | * | 43* | Hepatitis |
| female | * | 32* | Bronchitis |
| male | * | 27* | Sprained Ankle |
| female | * | 41* | Dyspepsia |

TABLE (d)

Join of Suppressed Table (c) and Table (b): SELECT Name, Gender, Date of Birth, Zipcode, Disease FROM Table (c) NATURAL JOIN Table (b)

| Identifier | Quasi-identifiers | | | Sensitive |
|---|---|---|---|---|
| Name | Gender | Date of Birth | Zipcode | Disease |
| Andre | male | 21/7/79 | 52000 | Flu |
| Beth | female | 10/1/81 | 43000 | Hepatitis |
| Carol | female | 1/10/44 | 32000 | Bronchitis |
| Dan | male | 21/2/84 | 27000 | Sprained Ankle |
| Ellen | female | 19/4/72 | 41000 | Dyspepsia |

Privacy of data plays a significant role in data trading. There are several data publishing techniques that tend to perform data transformation to maintain privacy. It is however pertinent to note that generality and suppression of certain components of data can affect utility as well as value of data that can be derived by a consumer. Quantifying the tradeoff between privacy and utility is a challenge that needs to be addressed in order for data sellers and data buyers to make an informed decision.

SUMMARY

Embodiments of the present disclosure present technological improvements as solutions to one or more of the above-mentioned technical problems recognized by the inventors in conventional systems.

In an aspect, there is provided a method comprising: receiving, by a data connector, data from one or more data sources for making the data consumable by one or more data buyers; analyzing, by an inflow data analyzer, the received data to extract and process metadata of the received data; identifying, by the inflow data analyzer, a search space comprising at least one sensitive attribute from the processed metadata based on a pre-defined knowledge base associated with the data; generating, by an adversary model generator, an adversary model by partitioning the search space into sets of buckets, each set corresponding to the at least one sensitive attribute having a privacy data associated thereof; computing, by the adversary model generator, bucket count for each of the sets of buckets and creating bucket combinations of the buckets from the sets of buckets; replacing, by the adversary model generator, the privacy data associated with each of the at least one sensitive attribute with a masking bucket from the buckets; computing, by the adversary model generator, an entity count for each of the bucket combinations based on the masking bucket assigned to the privacy data; computing, by the adversary model generator, an anonymity index based on the computed entity count and a pre-defined privacy threshold; and sanitizing, by a data masking module, the privacy data based on the computed anonymity index to generate output data.

In another aspect, there is provided a system comprising: one or more processors; and one or more internal data storage devices operatively coupled to the one or more processors for storing instructions configured for execution by the one or more processors, the instructions being comprised in: a data connector configured to: receive data from one or more data sources for making the data consumable by one or more data buyers; an inflow data analyzer configured to: analyze the received data to extract and process metadata of the received data; and identify a search space comprising at least one sensitive attribute from the processed metadata based on a pre-defined knowledge base associated with the data; an adversary model generator configured to: generate an adversary model by partitioning the search space into sets of buckets, each set corresponding to the at least one sensitive attribute having a privacy data associated thereof; compute bucket count for each of the sets of buckets and creating bucket combinations of the buckets from the sets of buckets; replace the privacy data associated with each of the at least one sensitive attribute with a masking bucket from the buckets; compute an entity count for each of the bucket combinations based on the masking bucket assigned to the privacy data; compute an anonymity index based on the computed entity count and a pre-defined privacy threshold; and continually learn and update the adversary model based on the received data; a data masking module configured to: sanitize the privacy data based on the computed anonymity index to generate output data; a decision helper module configured to: provide recommendations to data sellers based on the received data; an outflow data analyzer configured to: evaluate the output data to match requirements of the one or more data buyers; a data release management module configured to: determine a release plan based on the recommendations by the decision helper module; a report and alert management module configured to: generate evaluation reports and alerts based on the output data; and an event logging module configured to: log events associated with the output data.

In an embodiment, the system of the present disclosure may further comprise a data privacy-utility tradeoff calculator configured to: compute a utility index based on midpoint of the balanced buckets and the privacy data; and compute attribute variations based on the number of variations between the buckets and the balanced buckets.

In yet another aspect, there is provided a computer program product comprising a non-transitory computer readable medium having a computer readable program embodied therein, wherein the computer readable program, when executed on a computing device, causes the computing device to: receive data from one or more data sources for making the data consumable by one or more data buyers; analyze the received data to extract and process metadata of the received data; identify a search space comprising at least one sensitive attribute from the processed metadata based on a pre-defined knowledge base associated with the data; generate an adversary model by partitioning the search space into sets of buckets, each set corresponding to the at least one sensitive attribute having a privacy data associated thereof; compute bucket count for each of the sets of buckets and creating bucket combinations of the buckets from the sets of buckets; replace the privacy data associated with each of the at least one sensitive attribute with a masking bucket from the buckets; compute an entity count for each of the bucket combinations based on the masking bucket assigned to the privacy data; compute an anonymity index based on the computed entity count and a pre-defined privacy threshold; and sanitize the privacy data based on the computed anonymity index to generate output data.

In an embodiment of the present disclosure, the at least one sensitive attribute comprises one or more of binary, categorical, numerical and descriptive texts.

In an embodiment of the present disclosure, the adversary model generator is further configured to generate the sets of buckets based on one of (a) pre-defined ranges of values or (b) pre-defined upper and lower bounds, for each of the at least one sensitive attribute based on the pre-defined knowledge base.

In an embodiment of the present disclosure, the range of values and the upper and lower bounds are computed by the inflow data analyzer based on the at least one sensitive attribute.

In an embodiment of the present disclosure, the data masking module is further configured to sanitize the privacy data by one of (i) hierarchy masking techniques, (ii) bucket masking techniques, (iii) clustering technique or (iv) shuffling technique.

In an embodiment of the present disclosure, the shuffling technique is performed to obtain balanced buckets, wherein each bucket combination has a balanced entity count.

BRIEF DESCRIPTION OF THE DRAWINGS

The embodiments herein will be better understood from the following detailed description with reference to the drawings, in which:

FIG. 10A and FIG. 10B illustrate a shuffling based sanitization technique with moving entity count in a forward direction and backward direction respectively, in accordance with the present disclosure.

Figure 1:
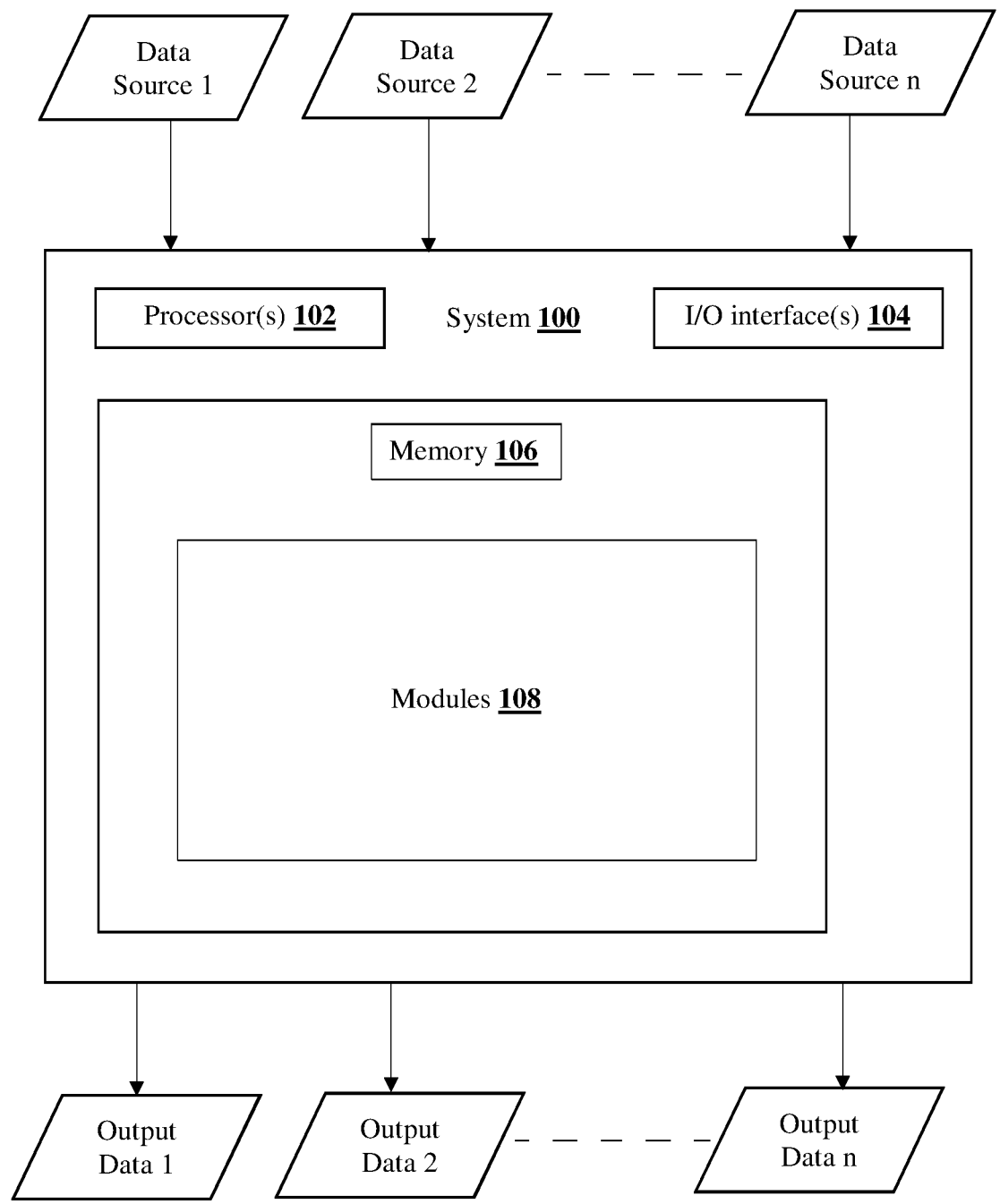
FIG. 1 illustrates an exemplary block diagram of a system for computing data privacy-utility tradeoff, in accordance with an embodiment of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Some embodiments of this disclosure, illustrating all its features, will now be discussed in detail. The disclosed embodiments are merely exemplary of the disclosure, which may be embodied in various forms. Before setting forth the detailed explanation, it is noted that all of the discussion below, regardless of the particular implementation being described, is exemplary in nature, rather than limiting.

Exchange or trade of data, particularly in data hubs like data marketplace is a challenge considering the expected tradeoff between data privacy and data utility. Systems and methods of the present disclosure address this challenge and facilitate computing this tradeoff to establish need for data transformation such that data buyers and data sellers make a meaningful trade.

Referring now to the drawings, and more particularly to FIGS. 1 through 9, where similar reference characters denote corresponding features consistently throughout the figures, there are shown preferred embodiments and these embodiments are described in the context of the following exemplary system and method.

The expression "data source" in the context of the present disclosure refers to at least one of (i) one or more entities or vendors who want to monetize data by listing products and solutions including data enrichments and analytics solutions; (ii) one or more entities or vendors who respond to an intent of service through bids and offers; (iii) one or more entities or vendors who push data from a premise to a data vault through API (iv) an entity who is selling personal data through one or more data brokers.

The expression "output data" in the context of the present disclosure refers to data provided to data buyers in the form received from the data source or data that may be selectively transformed based on an anonymity index as explained hereinafter.

The expression "data attacker" in the context of the present disclosure refers to an entity having malicious intent.

Figure 2:
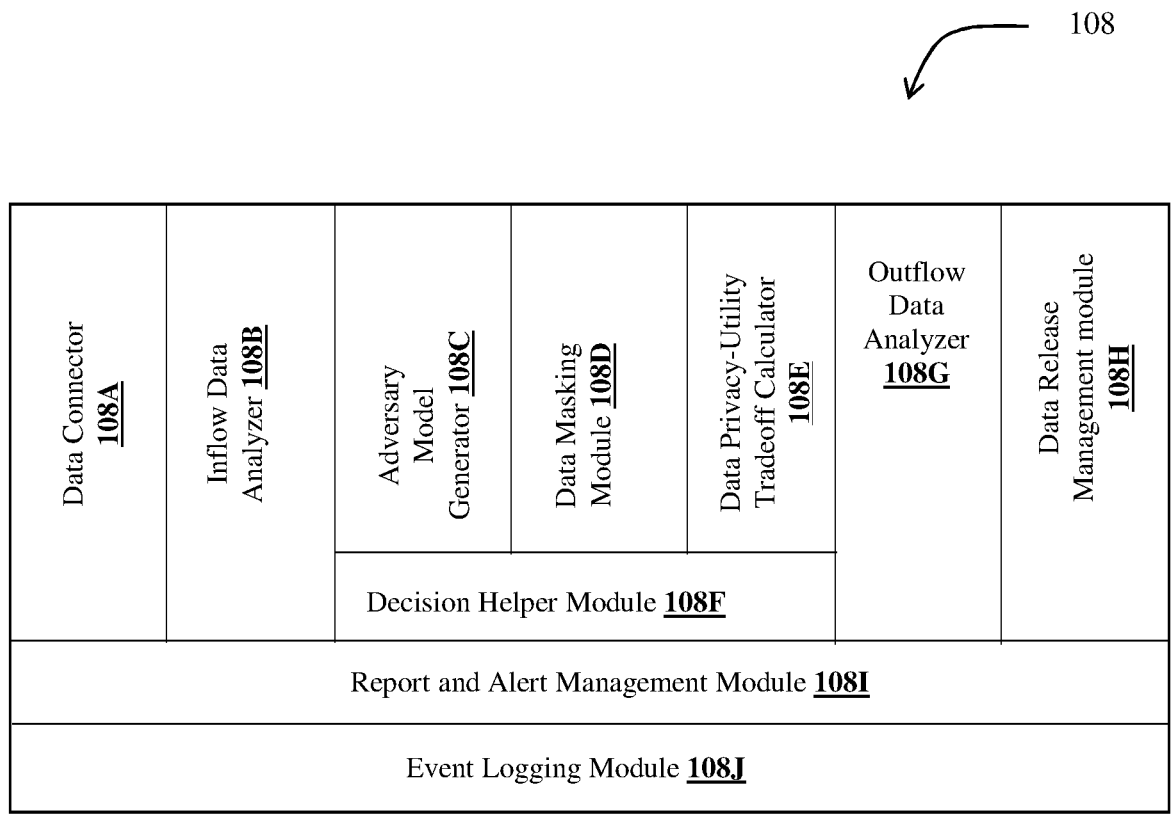
FIG. 2 is an exemplary representation of functional modules comprising the system of FIG. 1.

FIG. 1 illustrates a block diagram of a system 100 for computing data privacy-utility tradeoff and FIG. 2 is an exemplary representation of functional modules comprising the system 100, in accordance with an embodiment of the present disclosure.

In an embodiment, the system 100 includes one or more processors 102, communication interface device(s) or input/output (I/O) interface(s) 104, and memory 106 or one or more data storage devices comprising one or more modules 108 operatively coupled to the one or more processors 102. The one or more processors are hardware processors that can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in one or more computing systems, such as a laptop computer, a desktop computer, a notebook, a workstation, a mainframe computer, a server, a network server, cloud, hand-held device, wearable device and the like.

The I/O interface device(s) 104 can include a variety of software and hardware interfaces, for example, a web interface, a graphical user interface, IOT interface, and the like and can facilitate multiple communications within a wide variety of networks and protocol types, including wired networks, for example, LAN, cable, etc., and wireless networks, such as WLAN, cellular, or satellite. In an embodiment, the I/O interface device(s) 104 can include one or more ports for connecting a number of devices to one another or to another server.

The memory 106 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, various modules 108A through 108J (of FIG. 2) of the system 100 can be stored in the memory 106 as illustrated.

Figure 3A:
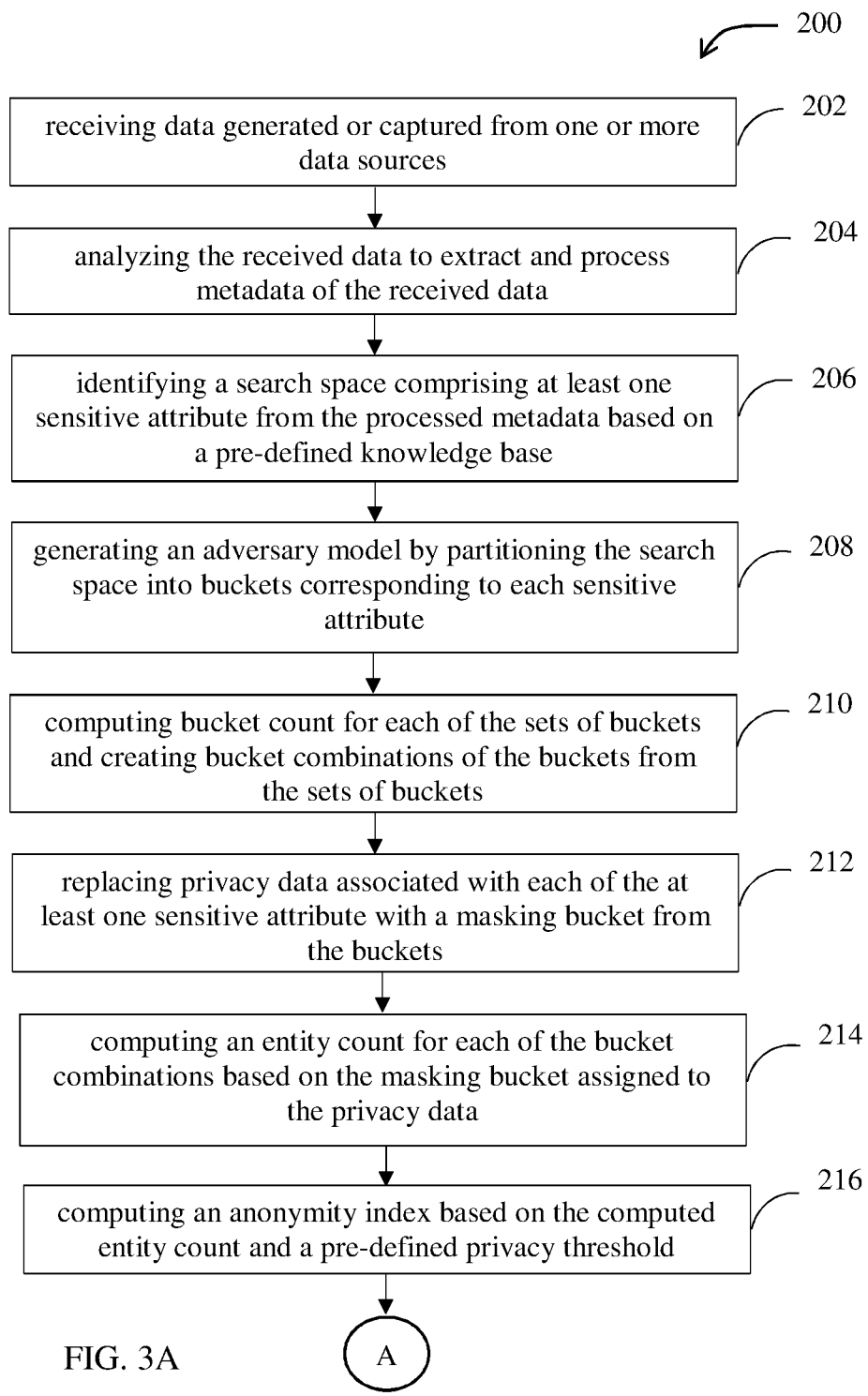
FIG. 3A and FIG. 3B represent an exemplary flow diagram illustrating a computer implemented method for computing the data privacy-utility tradeoff, in accordance with an embodiment of the present disclosure.
Figure 3B:
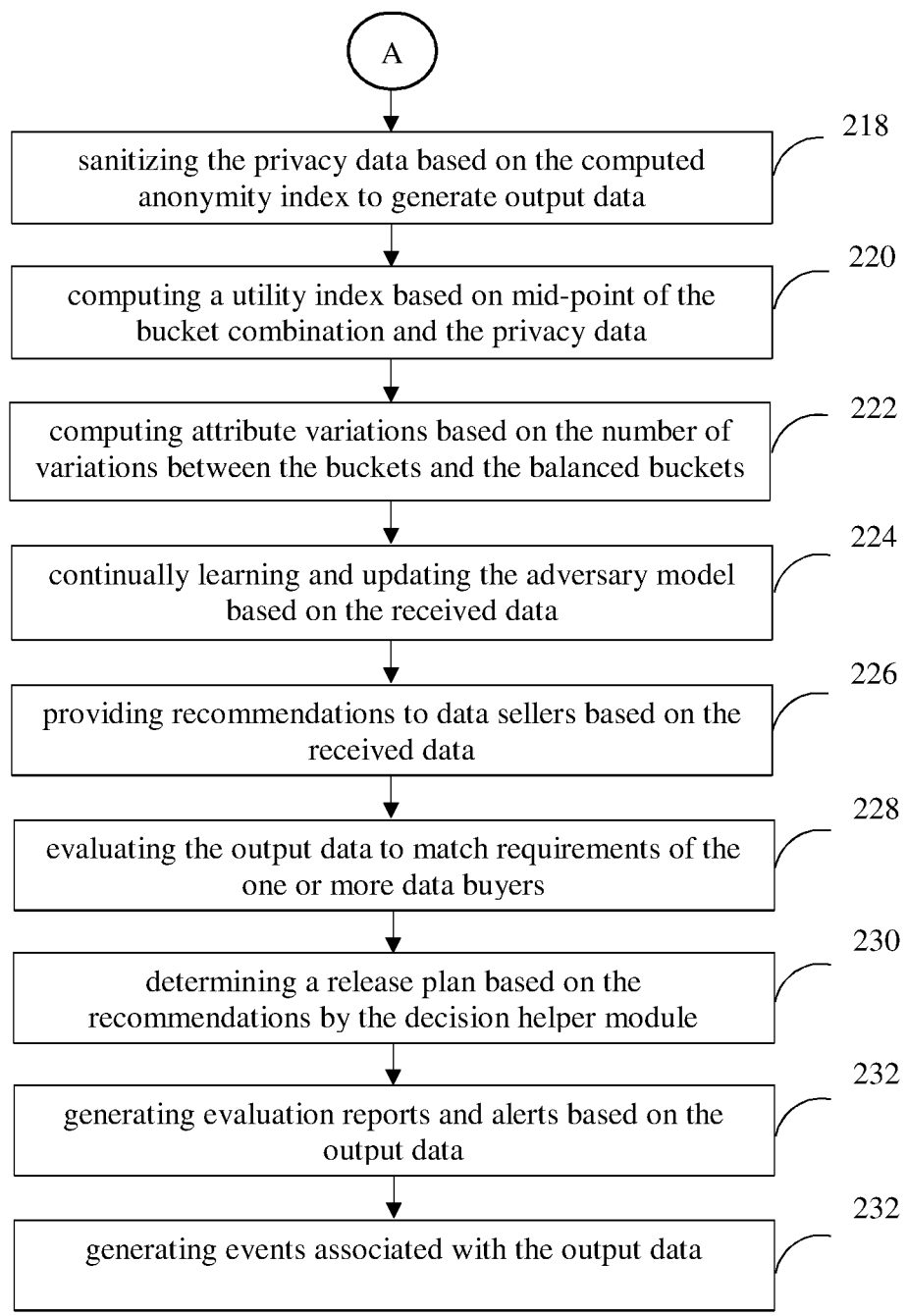

FIG. 3A and FIG. 3B represent an exemplary flow diagram illustrating a computer implemented method 200 for computing the data privacy-utility tradeoff, in accordance with an embodiment of the present disclosure. The steps of the computer implemented method 200 will now be explained with reference to the components of the system 100 as depicted in FIG. 1 and FIG. 2. In an embodiment, at step 202, the system 100 is configured to receive via a data connector 108A, data generated or captured from one or more data sources (Data Source 1, Data Source 2, . . . Data Source n) to make it consumable by one or more data buyers. In an embodiment, the data connector 108A can also be configured to receive a query and other parameters along with the data. For instance, the query may be in the form of a request for data pertaining to people in the age group 40-50 years and suffering from diabetes or people in a particular region having heart problems, and the like, wherein parameters of the query may include age, gender, place of residence, and the like. In accordance with the present disclosure, the received data is analyzed or processed to make it suitable for dissemination to one or more data buyers without losing its utility in the process of retaining privacy associated with the data. In an embodiment, the data connector 108A connects to the one or more data sources to receive generated or captured data in bulk format or streaming content format. Data in bulk format may be uploaded at pre-determined intervals or randomly by data sellers. Data in streaming content format may be data provided in real time by connecting with the one or more data sources such as Fitbit™ devices, accelerometer devices, temperature devices and electrical consumption devices.

At step 204, an inflow data analyzer 108B is configured to analyze the data received by the data connector 108A to extract and process metadata of the received data. In an embodiment, at step 206, the inflow data analyzer 108B processes the metadata to identify a search space comprising at least one sensitive attribute based on a pre-defined knowledge base of the platform. In an embodiment, the pre-defined knowledge base can be domain knowledge. In an embodiment, the knowledge base can be based on compliance requirements of prevailing laws/Acts such as HIPAA (Health Insurance Portability and Accountability Act), and other publicly available data sets. In accordance with the present disclosure, the sensitive attributes may comprise one or more of binary, categorical, numerical and descriptive texts. For instance, sensitive attributes can include tax paid in the current financial year, heart rate, location information, etc., personally identifying information of individuals such as name, address, SSN (Social Security Number), bank account numbers, passport information, healthcare related information, credit and debit card numbers, drivers license and state ID information, medical insurance information, student information, and the like. Data containing such sensitive attributes may lead to data privacy breaches if disseminated in its original form.

At step 208, an adversary model generator 108C is configured to generate an adversary model by partitioning the search space into sets of buckets; each set corresponding to a sensitive attribute having a privacy data associated thereof. For instance a bucket set may pertain to age and include buckets [0-9], [10-19], and the like. Another bucket set may pertain to diseases and include [diabetes], [heart disease], [lung disease], and the like. Sensitive attributes of data can be associated with two types of disclosures, viz., identity disclosure and value disclosure. Identity disclosure means a data attacker is able to identify data subject pertaining to that data. In addition, the data attacker may also learn data subject's PII, and can misuse it to commit fraud, to impersonate, etc. Value disclosure is the ability of a data attacker to be able to estimate the value of a sensitive attribute using the data available. Thus it is imperative that sensitive attributes that may lead to identity or value disclosure must be protected.

In an embodiment, the adversary model generator 108C is configured to identify information available in the public domain pertaining to the sensitive attributes from the one or more data sources. In an embodiment, the adversary model generator 108C is configured to continually learn from one or more of publicly available resources across the world including social media, collaborative filtering, crowdsourcing, public health data sets such as census, hospital data, etc. and also from data provided by data sellers. In an embodiment, the adversary model generator 108C is configured to learn and provide a suitable default template to the one or more data sources to choose and edit from.

In accordance with the present disclosure, the adversary model generator 108C is configured to generate one or more adversary models by first ascertaining the strength of an adversary that comprises knowledge of data and its operating strength. It is assumed that entities are points in a higher dimension real space $R^d$ and there are n such entities $\epsilon = e_1, e_2, \ldots, e_n$ that are points in d-dimension. The received data thus comprises n rows and d columns which means each $e_i$ is a d-dimensional point. The adversary tries to single out one or more entities by using his/her knowledge. The adversary may have some interest for attacking a database. For instance, the adversary may be a medical practitioner of diabetes and may want to send some spam to people for advertisement purposes. Say, in an exemplary case, the adversary may want to send emails on say, diabetes to a group of people who are above 40 years of age. Furthermore, the adversary may want to categorize people like mildly prone if age group between [40, 50], medium prone if age group between [50, 60] and say highly prone if age group above 60. In a majority of cases, the adversary is not interested in an exact age group or exact gender. The adversary is mainly interested in a range of given attributes. This helps the adversary to narrow down the search space (of people above 40 years of age) by finding elements that fall in the same range in the database. More precisely, the adversary will find groups of people of interest and then attack them. i.e. she will partition the space in buckets (or groups).

Data transformation to prevent privacy breach is required only if the adversary has knowledge of data under consideration. In the exemplary case, the strength of the adversary depends on parameters such as how many emails the adversary can send together, how many times the adversary can send emails and how much background knowledge the adversary has. If the number of emails the adversary can send together is k and number of times the adversary can send emails is equivalent to number of partitions or buckets of the database, the adversary will form as many partitions in the database as many messages she can send.

A bucketing technique, in accordance with the present disclosure is based on pre-defined upper and lower bounds for each of the sensitive attributes based on the pre-defined knowledge base. Alternatively, in an embodiment, the privacy data associated with each of the sensitive attributes is scanned by the inflow data analyzer 108B to get a lower bound and upper bound. For numeric attributes, buckets may be created after entering an interval. For example, in case of the attribute age, if lower bound is 4 and upper bound is 87 and entered interval is 40, then buckets for the attribute age may be [4,44] [45,85] [86,126].

For categorical attributes such as attribute marital status, buckets may be [Married] [Unmarried] [Divorced] [Separated] [Widowed].

Another bucketing technique based on pre-defined ranges of values, in accordance with the present disclosure is explained using an exemplary case wherein say, the adversary is interested in people who fall in the age group range 0 to 60. Let $r_i^{k_i}$ denote the buckets along each attribute at column i, where $k_i$ denotes the number of buckets in $i^{th}$ column. Each $r_i^{k_i}$ is associated with an integer number j such that index; $(r_i^{k_i})$=j where $1 \le j \le k_i$. index; (.) is the bucket number for the entity in $i^{th}$-dimension. For example, let there be a 3-dimensional table of attributes age, gender and zipcode. In the case of the attribute age, the adversary may have knowledge that a particular person belongs to the age group of [0-10] or [10-20] or [20-30] or [30-40] or [40-50] or [50-60]. So, $k_i$ for the attribute age is 6 and it can be represented as $r^1_{age}, r^2_{age}, \ldots, r^6_{age}$. In case of the attribute gender, the adversary may have knowledge that the person is male or female. So, $k_i$ for the attribute gender is 2 and it can be represented as $r^1_{gender}, r^2_{gender}$ (assuming male=1 and female=2). In case of the attribute zipcode where the range is from 1 to $10^5$ approximately, the adversary may have knowledge up to 1000 buckets. For simplicity, $10^5$ is divided by 1000 and hence the buckets are [0-1000], [1000-2000], . . . , [99900-100000]. So, $k_i$ for the attribute zipcode is 100 and it can be represented as $r^1_{zipcode}, r^1_{zipcode}, \ldots, r^{100}_{zipcode}$. Let age be the $1^{st}$ dimension, gender be the $2^{nd}$ dimension, and zipcode be the $3^{rd}$ dimension for each entity. So, instead of using age, gender, zipcode in the suffix of $r_i^{k_i}$, the dimensions can be used as $r_i^{k_i}$ for i=1, 2, 3. In an embodiment, the above bucketing technique can be made more complicated by considering that the adversarial knowledge is hierarchical or the adversary is interested in a particular value of the attributes.

In another exemplary case, say the adversary is interested in person(s) whose information may be as follows: the person's age is between 20 and 30, gender is female, and zipcode is in between 7000-8000 (assuming these are all the zipcodes belong to New York city). Let all the n points be plotted in a d-dimensional space. Then the adversary would search for all persons satisfying the d-dimensional rectangle made by the above range of information. If the adversary finds no element in that rectangle then he/she has not found anything. If the adversary finds only one person there then he/she has got the person. Again, if the adversary finds more than one person there then all those persons are equally likely and the adversary will be confused and have difficulty in identifying a particular person. In the above exemplary case, the $index_i$ ($r_i^{k_i}$) are 3, 2, 8 for age, gender and zipcode respectively. It implies that the person falls in the $3^{rd}$ bucket in $1^{st}$ dimension, $2^{nd}$ bucket in $2^{nd}$ dimension, $8^{th}$ bucket in $3^{rd}$ dimension. So, a person's identity can be represented in the form of an index format which is a single dimension representation of the multidimensional search space. The index format of a person can be discovered using the same search space in O(d) time (where time is proportional to number of dimensions), assuming $k_i$ is constant for a given database. In accordance with the present disclosure, the total number of distinct buckets are $B=\Pi_{i=1}^{d} k_i$. Here each bucket is a d-dimensional rectangle, say $DR_i$, for $1 \le i \le B$. For an array A of size B, each entry of the array contains an integer $p_i$ and $p_i$ denotes the number of entities in each bucket $DR_i$.

In accordance with the present disclosure, if the index format of an entity is known, then following formula will put the entity in the right place of the array position, say array index ρ given by—

$$\rho=(index_1-1)\Pi_{i=2}^{d} k_i+(index_2-1)\Pi_{i=3}^{d} k_i+ \ldots (index_i-1)\Pi_{i=i+1}^{d} k_i+(index_{d-1}-1)\Pi_{i=d}^{d} k_i+(index_d) \quad (1)$$

In accordance with the present disclosure, array A is initialized to zero. Array A maintains count of all buckets $DR_i$, where the number of entities correspond to $i^{th}$ location of each bucket DR. In the present example, $DR_i$, contains 180 bucket combinations defined in Table (f) herein below. The index format for entity is computed. The array index ρ for the entity is calculated using equation 1 herein above and for the array index ρ, update A [ρ] by 1 as A[ρ]+=1.

In accordance with the present disclosure, in the technique for computing the count of entities in each bucket $DR_i$, the number of entities can be found just using one pass through the database and one pass in the array A. Also, the number of elements $p_i$ computed in each bucket $DR_i$ is correct, which is validated by the fact that the formula above shows that entities in different index format will fall in different buckets.

In an embodiment, at step 210, the adversary model generator 108C is configured to compute bucket count for each of the sets of buckets and further create bucket combinations of the buckets from the sets of buckets. For instance, let there be a 5-dimensional table of attributes age, gender, marital status, salary and zipcode and assuming privacy data is available for 300 people as shown in Table (e) herein below.

TABLE (e)

| Attribute | Buckets | Count Of Bucket |
| --- | --- | --- |
| age | [4, 44] [45, 85] [86, 126] | 3 |
| gender | [male] [female] | 2 |
| Marital status | [Married] [Unmarried] [Separated] [Divorced] [Widowed] | 5 |
| salary | [5000, 105000] [105001, 205001] [205002, 305002] | 3 |
| zipcode | [7000, 507000] [507001, 1007001] | 2 |

Bucket combinations may be created in accordance with the present disclosure as shown (partially) in Table (f) herein below.

TABLE (f)

| Attributes | Combination Of Buckets |
| --- | --- |
| age-gender-marital_status-salary-zipcode | [4, 44]-[male]-[Married]-[5000, 105000]-[7000, 507000] |
| age-gender-marital_status-salary-zipcode | [4, 44]-[male]-[Married]-[5000, 105000]-[507001, 1007001] |
| age-gender-marital_status-salary-zipcode | [4, 44]-[male]-[Married]-[105001, 205001]-[7000, 507000] |
| . . . | . . . |
| . . . | . . . |

In an embodiment, at step 212, the adversary model generator 108C is configured to replace the privacy data associated with each of the at least one sensitive attribute with a masking bucket from the buckets. Accordingly, the privacy data associated with each of the at least one sensitive attribute is replaced with buckets that have been created in Table (e) that now serve as masking buckets. For instance, assume privacy data available is as shown (partially) in Table (g) herein below.

TABLE (g)

| age | gender | marital status | salary | zipcode |
|---|---|---|---|---|
| 55 | female | Separated | 27000 | 80003 |
| 67 | female | Married | 37000 | 40001 |
| 51 | male | Widowed | 56000 | 40009 |
| 67 | male | Married | 80000 | 54003 |
| ... | ... | ... | ... | ... |
| ... | ... | ... | ... | ... |

The privacy data of Table (g) may be replaced by masking buckets as shown (partially) in Table (h) herein below.

TABLE (h)

| age | gender | marital status | salary | zipcode |
|---|---|---|---|---|
| [45-85] | [female] | [Separated] | [5000, 105000] | [7000, 507000] |
| [45-85] | [female] | [Married] | [5000, 105000] | [7000, 507000] |
| [45-85] | [male] | [Widowed] | [5000, 105000] | [7000, 507000] |
| [45-85] | [male] | [Married] | [5000, 105000] | [7000, 507000] |
| ... | ... | ... | ... | ... |
| ... | ... | ... | ... | ... |

In an embodiment, at step 214, the adversary model generator 108C is configured to compute an entity count for each of the bucket combinations of Table (f) based on the masking bucket assigned to the privacy data in Table (h) as shown in Table (i) herein below.

TABLE (i)

| Attributes | Combination Of Buckets | Count Of Entity |
|---|---|---|
| age-gender-marital_status-salary-zipcode | [4, 44]-[male]-[Married]-[5000, 105000]-[7000, 507000] | 6 |
| age-gender-marital_status-salary-zipcode | [4, 44]-[male]-[Married]-[5000, 105000]-[507001, 1007001] | 8 |
| age-gender-marital_status-salary-zipcode | [4, 44]-[male]-[Married]-[105001, 205001]-[7000, 507000] | 0 |
| age-gender-marital_status-salary-zipcode | [4, 44]-[male]-[Married]-[105001, 205001]-[507001, 1007001] | 5 |
| ... | ... | ... |
| ... | ... | ... |

If comparison is same for more than one row in Table (f), the entity count is incremented by one. For instance, Table (i) shows that there are 6 people whose age lies in the range 4-44, have gender as male, marital status is married, salary lies in the range 5000-105000, and zipcode falls in the range 7000-507000.

Privacy of a database follows the principles listed herein below—
- If the population surrounding an entity increases, the privacy for that particular entity increases.
- If the power of adversary increases, then privacy decreases.
- If the adversary knowledge of the dimensions increases, the privacy decreases.
- If total population increases then the overall privacy increases.

In an embodiment, privacy is based on K-anonymity or blending in a crowd.

In an embodiment, at step 216, the adversary model generator 108C is configured to measure an anonymity index of each entity associated with the received data. The anonymity index may be computed based on the computed entity count (Table (i)) and a pre-defined privacy threshold. The adversary has the knowledge only up to the buckets. The elements that lie inside the same bucket are equally likely to the adversary. Higher the anonymity-index, higher is the associated privacy. Hence, in accordance with the present disclosure, the anonymity-index is the privacy measure of a database.

Anonymity index shows how much the received data is safe with respect to an adversary. To calculate the anonymity index, firstly a pre-defined privacy threshold is set, which in the example case presented herein, is the size of the crowd to blend in. Privacy laws may be adhered to pre-define the privacy threshold. For instance, Health Insurance Portability and Accountability Act (HIPAA) privacy rule says that threshold should be 20,000 and for Family Educational Rights and Privacy Act (FERPA), threshold is 5.

In accordance with the present disclosure, if entity count<privacy threshold, $$\text{anonymity index} = \frac{\text{entity count}}{\text{privacy threshold}}$$

else anonymity index=1.

Accordingly, for a case wherein the privacy threshold=10 and the entity count from Table (i)=5, the entity count<the pre-defined privacy threshold, the index=5/10=0.5.

For a case wherein the privacy threshold=10 and the entity count from Table (i)=15, the entity count>=the pre-defined privacy threshold, the anonymity index=15/10=1.5≈1 (rounded off to 1.0, as it cannot be higher than 1.0).

Accordingly, for a privacy threshold=10, the anonymity index may be computed for privacy data of the 300 people under consideration as shown (partially) in Table (j) herein below.

TABLE (j)

| Attributes | Combination Of Buckets | Count Of Entity | Anonymity Index |
|---|---|---|---|
| age-gender-marital_status-salary-zipcode | [4, 44]-[male]-[Married]-[5000, 105000]-[7000, 507000] | 6 | 0.6 |
| age-gender-marital_status-salary-zipcode | [4, 44]-[male]-[Married]-[5000, 105000]-[507001, 1007001] | 8 | 0.8 |
| age-gender-marital_status-salary-zipcode | [4, 44]-[male]-[Married]-[105001, 205001]-[7000, 507000] | 0 | 0 |
| age-gender-marital_status-salary-zipcode | [4, 44]-[male]-[Married]-[105001, 205001]-[507001, 1007001] | 5 | 0.5 |
| age-gender-marital_status-salary-zipcode | [4, 44]-[male]-[Married]-[205002, 305002]-[7000, 507000] | 0 | 0 |
| age-gender-marital_status- | [4, 44]-[male]-[Married]- | 0 | 0 |

TABLE (j)-continued

| Attributes | Combination Of Buckets | Count Of Entity | Anonymity Index |
|---|---|---|---|
| salary-zipcode | [205002, 305002]-[507001, 1007001] | | |
| age-gender-marital_status-salary-zipcode | [4, 44]-[male]-[Unmarried]-[5000, 105000]-[7000, 507000] | 6 | 0.6 |
| age-gender-marital_status-salary-zipcode | [4, 44]-[male]-[Unmarried]-[5000, 105000]-[507001, 1007001] | 14 | 1 |
| ... | ... | ... | ... |
| ... | ... | ... | ... |

In accordance with the present disclosure, if anonymity index<1, then the entities are moved to another combination of buckets. The data may be normalized to facilitate drawing of an anonymity graph between normalized anonymity index and privacy threshold since normalization of data may be necessary to convert anonymity index values to a common scale and facilitate comparing the shape or position of two or more curves. Accordingly, further comparison of anonymity index with attribute variations may be performed as explained herein under.

$$\text{Normalized anonymity index } [0, 1] = \frac{\Sigma(\text{entity count} * \text{anonymity index})}{\text{total no. of people}}$$

For a scenario wherein total no. of people=20, privacy threshold=10 and entity count for two bucket combinations=5 and 15, the anonymity index for these entity counts are 0.5 and 1 respectively.

$$\text{Normalized anonymity index } [0, 1] = \frac{(5*0.5) + (15*1)}{20} = \frac{2.5 + 15}{20} = \frac{17.5}{20} = 0.875$$

Figure 4:
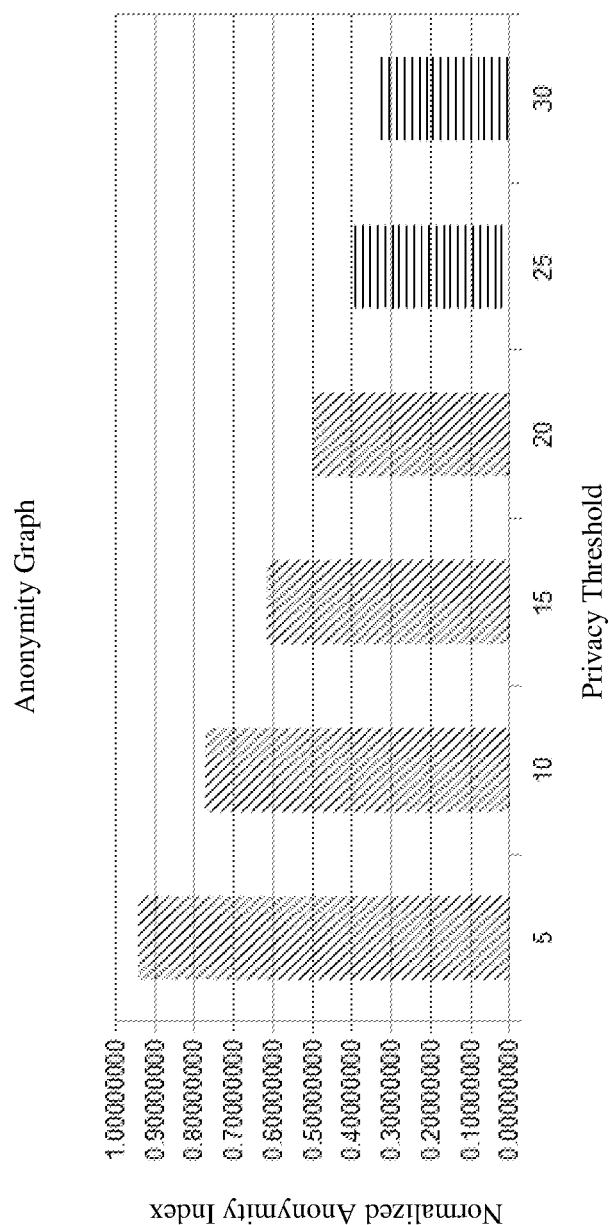
FIG. 4 is a graphical illustration of normalized anonymity index versus privacy threshold for an exemplary set of data, in accordance with the present disclosure.

FIG. 4 is a graphical illustration of normalized anonymity index versus privacy threshold for an exemplary set of privacy data for 300 people, in accordance with the present disclosure. It may be observed from the anonymity graph of FIG. 4 that as long as privacy threshold increases, anonymity index keeps on decreasing. It may be further noted that if anonymity index is higher privacy will be higher. The two columns with horizontal hatch patterns in FIG. 4 denote values of normalized anonymity index which has crossed certain limits, thereby suggesting a need for data sanitization for the particular exemplary set of privacy data.

In an embodiment, at step 218, a data masking module 108D is configured to sanitize the privacy data based on the computed anonymity index to generate output data. In an embodiment, data masking or data sanitizing may be performed by one or more (i) hierarchy masking techniques, (ii) bucket masking techniques, (iii) clustering technique or (iv) shuffling technique. In an embodiment, the shuffling technique is performed to obtain balanced buckets, wherein each bucket combination has a balanced entity count. In accordance with the present disclosure, the data masking module 108D sanitizes data such that utility of the masked data is ensured for a meaningful trade. Utility is a measure of distortion of data. Randomization techniques may change data too much and may also generate data which is close to original.

Figure 5:
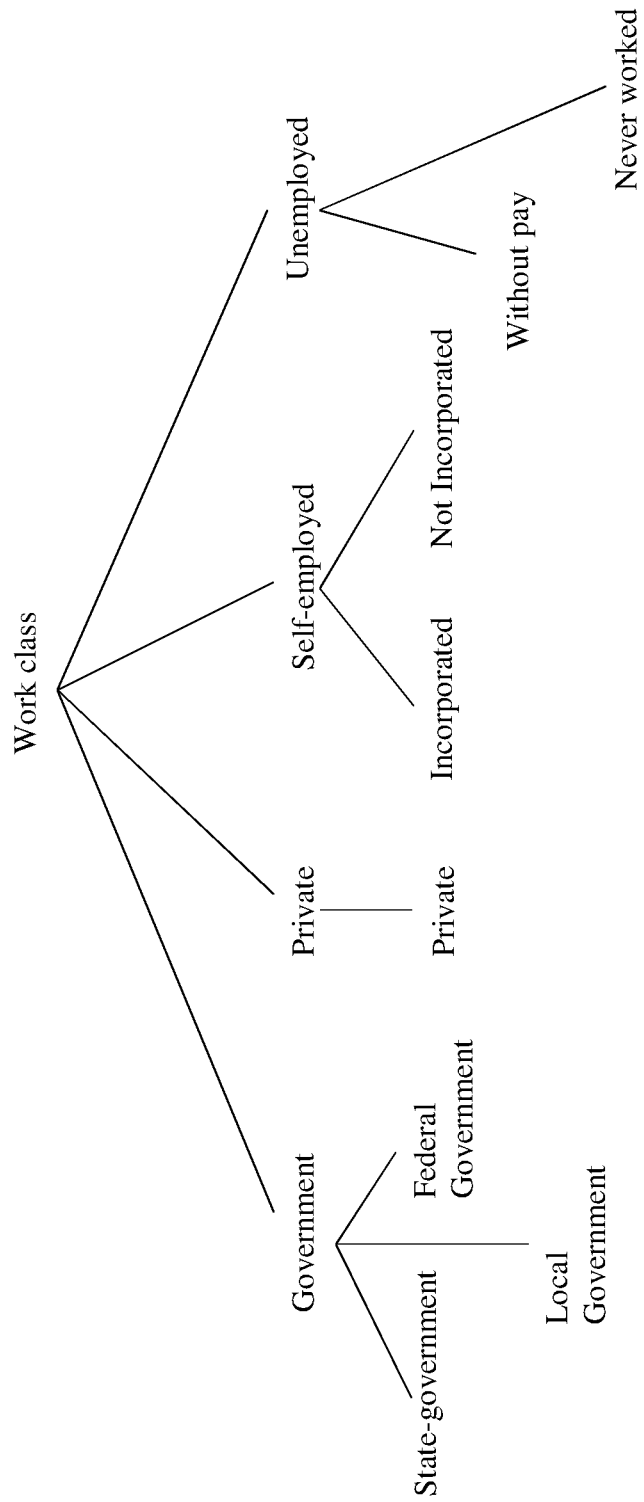
FIG. 5 is a schematic representation of an exemplary value generalization hierarchy for an attribute "work class"

In an embodiment, the hierarchy/bucket masking technique enables user to control amount of data change required while preserving privacy. FIG. 5 is a schematic representation of an exemplary value generalization hierarchy for an attribute "work class". In the exemplary embodiment of a work class hierarchy, if root node at level 0 refers to work class, nodes at level 1 refer to work classes viz., self-employed, government, private and unemployed and nodes at level 2 refer to further sub-work classes such as Incorporated or not Incorporated for self-employed class, Federal, State or Local for government class and without pay or never worked classes for unemployed class. In an embodiment, input to the hierarchy/bucket masking technique can include generalized hierarchy as explained in the work class example herein above, pre-defined masking levels for each class and merging or segregation of neighbor buckets (neighbor flag). The technique is configured to identify whether the count of people satisfy the privacy threshold or not after merging siblings of leaf node at level 2. If count of people does not satisfy the privacy threshold, the leaf nodes at level 2 may be merged with nodes at level 1 and the merging may continue until the requirement is satisfied at level 0.

In accordance with the present disclosure, utility index is a negative of the sum of distortion added to each individual data point. In an embodiment, the data masking module 108D is further configured to minimize the maximum distortion for a data point using a clustering based sanitization technique. In accordance with the present disclosure, when data is transformed, the transformed data must preserve privacy requirements based on the pre-defined privacy threshold T. For a given privacy threshold T and database DB, data has to be transformed from DB to $DB^T$ such that either each bucket contains a fraction of data or the bucket is empty. In accordance with the present disclosure, while transferring DB to $DB^T$ another constraint to be satisfied is that data distortion must be as minimum as possible with respect to a pre-defined metric. In an embodiment, if the entities in the database are considered as points in real space $R^d$, then Euclidean metric is to be considered.

In an embodiment, the clustering based sanitization technique to minimize the maximum distortion for a data point provides a constant factor approximation with respect to a very strong adversary. Using a 2-factor approximation algorithm for r-gathering as known in the art, clusters $C_i$ ($C_1$, $C_2$, ..., $C_k$) are identified such that each cluster $C_i$ contains at least r database points and the radius of the cluster is minimized. It is similar to data sanitization concept, where each balanced bucket contains a value greater than or equal to the privacy threshold. Subsequently, buckets are identified for each cluster $C_i$. Let $DR_1^i$, $DR_2^i$, ..., $DR_j^i$ are the buckets inside C such that all the data points that belong to $C_i$ are pushed in the bucket $DR_i^c$ that contains the center c of $C_i$.

In an embodiment, the clustering based sanitization technique may be K-Means clustering to replace actual values with centroids. Euclidean distance is used to calculate centroids and it uses Manhattan distance to evaluate clusters. Accordingly, K-medoid clustering algorithm for heterogeneous datasets may be used. For categorical datasets, this algorithm uses co-occurrence based approach. For numerical datasets, K-medoid uses Manhattan distance. For binary datasets, K-medoid uses hamming distance (0|1).

In an embodiment, the data masking module 108D is further configured to minimize the maximum distortion for a data point by providing a heuristic technique to produce k-anonymity and comparing it with a naive technique. In an embodiment the naive technique involves replacing all attributes of first k-entities by a first entity. Then the next k entities are replaced by $(k+1)^{th}$ entity and so on. In an embodiment, the heuristic technique involves inputting an array A with entity count $p_i$ and outputting an array $A^T$ with entity count either ($p_i$=0) or ($p_i \geq k$) for bucket $DR_i$.

In an embodiment, the shuffling based sanitization technique includes moving entity count to nearest position in forward or backward direction as illustrated in FIG. 10A and FIG. 10B respectively.

Forward shifting example (Refer FIG. 10A): Let Array A with entity count A(i) for bucket $DR_i$.

A={1, 2, 3, 4, 5, 7, 8}

Let the privacy threshold=10, elements are moved from first position in forward direction until it becomes greater than or equal to the privacy threshold. If the entity count is balanced, then the shifting of elements resumes from next position. The forward shifting is continued until all balanced values are obtained as A'=[0, 0, 0, 10, 0, 0, 20].

Backward shifting example (Refer FIG. 10B): Elements are moved from last position until it becomes greater than or equal to the privacy threshold. Similar to the forward shifting, the backward shifting is continued until all balanced values are obtained as A'=[15, 0, 0, 0, 0, 15, 0].

Table (k) herein below depicts (partially) balanced entity count for the privacy data of 300 people, if the privacy threshold=10.

TABLE (k)

| Attributes | Combination Of Buckets | Forward Shifted Entity Count | Backward Shifted Entity Count |
|---|---|---|---|
| age-gender-marital_status-salary-zipcode | [4, 44]-[male]-[Married]-[5000, 105000]-[7000, 507000] | 0 | 14 |
| age-gender-marital_status-salary-zipcode | [4, 44]-[male]-[Married]-[5000, 105000]-[507001, 1007001] | 14 | 0 |
| age-gender-marital_status-salary-zipcode | [4, 44]-[male]-[Married]-[105001, 205001]-[7000, 507000] | 0 | 0 |
| age-gender-marital_status-salary-zipcode | [4, 44]-[male]-[Married]-[105001, 205001]-[507001, 1007001] | 0 | 11 |
| age-gender-marital_status-salary-zipcode | [4, 44]-[male]-[Married]-[205002, 305002]-[507001, 1007001] | 0 | 0 |
| age-gender-marital_status-salary-zipcode | [4, 44]-[male]-[Married]-[205002, 305002]-[507001, 1007001] | 0 | 0 |
| age-gender-marital_status-salary-zipcode | [4, 44]-[male]-[Unmarried]-[5000, 105000]-[7000, 507000] | 11 | 0 |
| age-gender-marital_status-salary-zipcode | [4, 44]-[male]-[Unmarried]-[5000, 105000]-[507001, 107001] | 14 | 22 |
| ... | ... | ... | ... |
| ... | ... | ... | ... |

For minimum shuffling between elements, the order of bucket values may be sorted or changed based on attributes. For instance, it may be sorted as Order by attribute age, Order by attribute gender, Order by attribute marital status, Order by attribute salary, Order by attribute zip code. Order by attribute age may be as shown below in Table (l)

TABLE (l)

| Attributes | Combination Of Buckets |
|---|---|
| age-gender-marital_status-salary-zipcode | [4, 44]-[male]-[married]-[5000, 105000]-[7000, 507000] |
| age-gender-marital_status-salary-zipcode | [45, 85]-[male]-[married]-[5000, 105000]-[7000, 507000] |
| age-gender-marital_status-salary-zipcode | [86, 126]-[male]-[married]-[5000, 105000]-[7000, 507000] |
| age-gender-marital_status-salary-zipcode | [4, 44]-[male]-[married]-[105001-205001]-[7000, 507000] |
| age-gender-marital_status-salary-zipcode | [45, 85]-[male]-[married]-[105001-205001]-[7000, 507000] |
| age-gender-marital_status-salary-zipcode | [86, 126]-[male]-[married]-[105001-205001]-[7000, 507000] |

Similar sorting of the order of bucket values may be performed for attributes gender, marital status, salary and zip code in the exemplary embodiment provided.

After changing the order of attributes, forward and backward shifting is applied as explained above which may result in less stress on data for some particular attributes. Thus if curve fitting is performed for forward and backward shifting of attribute variations, then R squared has a value near to 1. where R squared is the coefficient of determination which is indicative of how well a regression line approximates actual data points. If R squared is near to 1, then the curve fitting is considered as a best curve fitting.

In an embodiment, the utility index provides how far values have been moved from original position to balanced position. As an example, suppose a person belongs to New York and another person belongs to Washington. To get a desired amount of privacy, if the person belonging to New York is moved to Washington, the utility index is indicative of the distance between New York and Washington.

In accordance with the present disclosure, at step 220, a data privacy-utility tradeoff calculator 108E is configured to compute the utility index for numerical attributes:

Utility Index=Mid points of balanced bucket−Privacy data (Primary value of original bucket)

For instance, suppose a bucket [6999, 507000] of attribute zipcode has been moved from original position to bucket [507001,1007002] of balanced position.

Also, primary value of [6999,507000] is 50001 and midpoint of [507001,1007002] is 757001((507001+1007002)/2).

Utility Index of zipcode=757001−50001=707000

In case of categorical attributes, Utility Index=1. For instance, if attribute marital status, [Married] is changed to [Unmarried], the Utility Index=1.

Furthermore, to minimize the maximum distortion of values, the utility index is normalized as given below.

$$\text{Normalized Utility Loss } [0, 1] = \frac{\text{Existing value of utility index} - \text{Min value of utility index}}{\text{Max value of utility index} - \text{Min value of utility index}}$$

For instance, in case of numerical attributes, let existing value of the utility index for attribute zipcode=707000 and its min and max value be 264254 and 722978 respectively.

$$\text{Normalized Utility Loss } [0, 1] = \frac{707000 - 264254}{722978 - 264254} = 0.965168595$$

For categorical attributes, Normalized Utility Loss [0,1]= 1.000000. Table (m) herein below depicts the utility index (partially) for the privacy data of 300 people, if the privacy threshold=10.

TABLE (m)

| Attributes | Original Buckets | Balanced Buckets | Original Attribute Value | Mid Points Of Bucket | Utility Index | Utility Loss |
|---|---|---|---|---|---|---|
| age | [4, 44] | [4, 44] | 27 | 24 | 0 | 0 |
| gender | [male] | [male] | male | male | 0 | 0 |
| marital_status | [Married] | [Married] | Married | Married | 0 | 0 |
| salary | [5000, 105000] | [5000, 105000] | 80000 | 55000 | 0 | 0 |
| zipcode | [7000, 507000] | [507001, 1007001] | 50001 | 757001 | 707000 | 0.98 |
| ... | ... | ... | ... | ... | ... | ... |
| ... | ... | ... | ... | ... | ... | ... |

In an embodiment, at step 222, the data privacy-utility tradeoff calculator 108E is configured to compute attribute variations based on the number of variations between the buckets (original buckets) and the balanced buckets.

For instance, if values of one combination of attributes age-gender-marital status-salary-zipcode

[3,44]-[male]-[Married]-[105001,205002]-[507001, 1007002] has been moved to

[3,44]-[male]-[Unmarried]-[4999,105000]-[6999, 507000]

Total number of attribute moves=3

Table (n) illustrates attribute variations for the privacy data (partially) of 300 people if the privacy threshold=10.

TABLE (n)

| Attributes | Original Buckets | Balanced Buckets | Movement Of Attributes |
|---|---|---|---|
| age-gender-marital_status-salary-zipcode | [4, 44]-[male]-[Married]-[5000, 105000]-[7000, 507000] | [4, 44]-[male]-[Married]-[5000, 105000]-[507001, 1007001] | 1 |
| age-gender-marital_status-salary-zipcode | [4, 44]-[male]-[Married]-[5000, 105000]-[507001, 1007001] | [4, 44]-[male]-[Married]-[5000, 105000]-[507001, 1007001] | 0 |
| age-gender-marital_status-salary-zipcode | [4, 44]-[male]-[Married]-[105001, 205001]-[7000, 507000] | [4, 44]-[male]-[Married]-[105001, 205001]-[7000, 507000] | 0 |
| age-gender-marital_status-salary-zipcode | [4, 44]-[male]-[Married]-[105001, 205001]-[507001, 1007001] | [4, 44]-[male]-[Unmarried]-[5000, 105000]-[7000, 507000] | 3 |
| age-gender-marital_status-salary-zipcode | [4, 44]-[male]-[Married]-[205002, 305002]-[7000, 507000] | [4, 44]-[male]-[Married]-[205002, 305002]-[7000, 507000] | 0 |
| ... | ... | ... | ... |
| ... | ... | ... | ... |

Furthermore, to bring all the variables into proportion with one another, normalizing attribute movement as—

$$\text{Normalized attribute movement } [0, 1] = \frac{\sum \frac{|\text{Existing attribute move} - \text{Min. attribute move}|}{|\text{Max. attribute move} - \text{Min. attribute move}|}}{\text{Total no of people}}$$

For instance, if attribute movement for four combination of buckets are 1, 0, 0, 3 and total no. of people are 20, min. value of attribute move is 1 and max. value of attribute move is 3.

Normalized attribute movement $[0, 1] =$ $$\frac{\left(\frac{|1-1|}{|3-1|}\right) + 0 + 0 + \left(\frac{|3-1|}{|3-1|}\right)}{20} = \frac{1}{20} = 0.05$$

Figure 6:
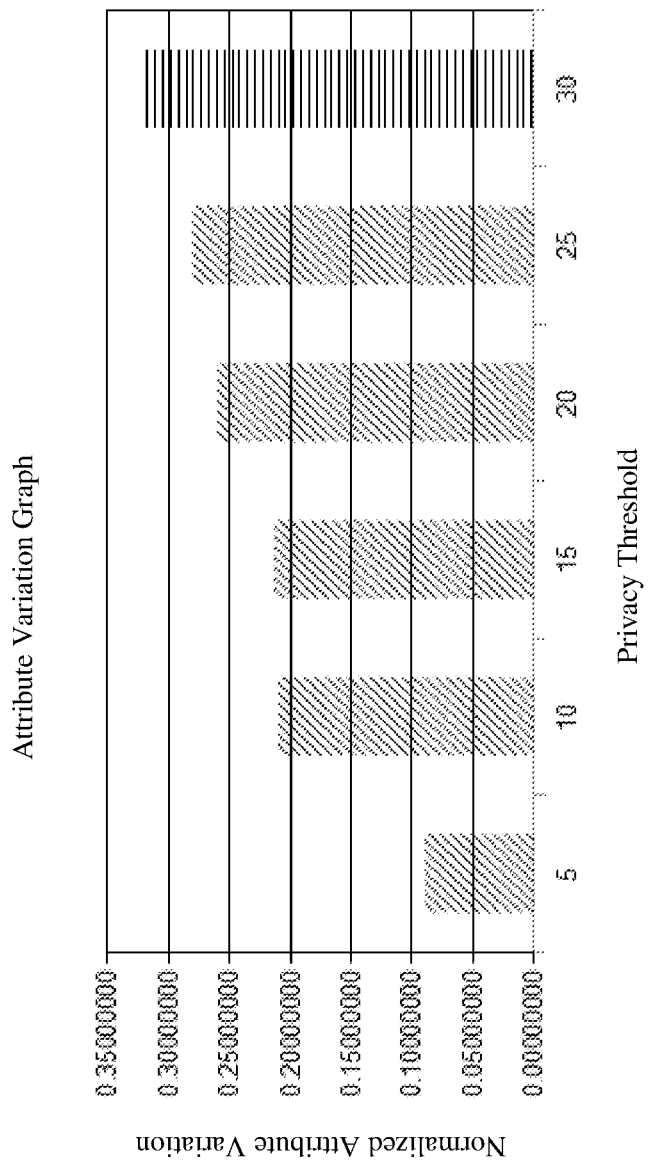
FIG. 6 is a graphical illustration of normalized attribute variation versus privacy threshold for an exemplary set of data, in accordance with the present disclosure.

FIG. 6 is a graphical illustration of normalized attribute variation versus privacy threshold for an exemplary set of data for 300 people, in accordance with the present disclosure. It may be observed from the attribute variation graph of FIG. 6 that as long as privacy threshold increases, attribute variation keeps on increasing. Accordingly, if the attribute movement is lower, then utility loss will be minimum since there will be less data massaging.

In accordance with the present disclosure, a comparison, by the data privacy-utility tradeoff calculator 108E, of the attribute variations and the anonymity index provides a data privacy-utility tradeoff. In accordance with the present disclosure, the data privacy-utility tradeoff facilitates a data buyer to decide the utility of the output data. For example, it could be generalization details for some specific attributes (e.g., only first 2 digits of zipcode are going to be made available, or it could be only last 4 digits of SSN, etc.). In an embodiment, the data privacy-utility tradeoff calculator 108E can compute a utility index and utility loss as illustrated in Table (m).

Figure 7:
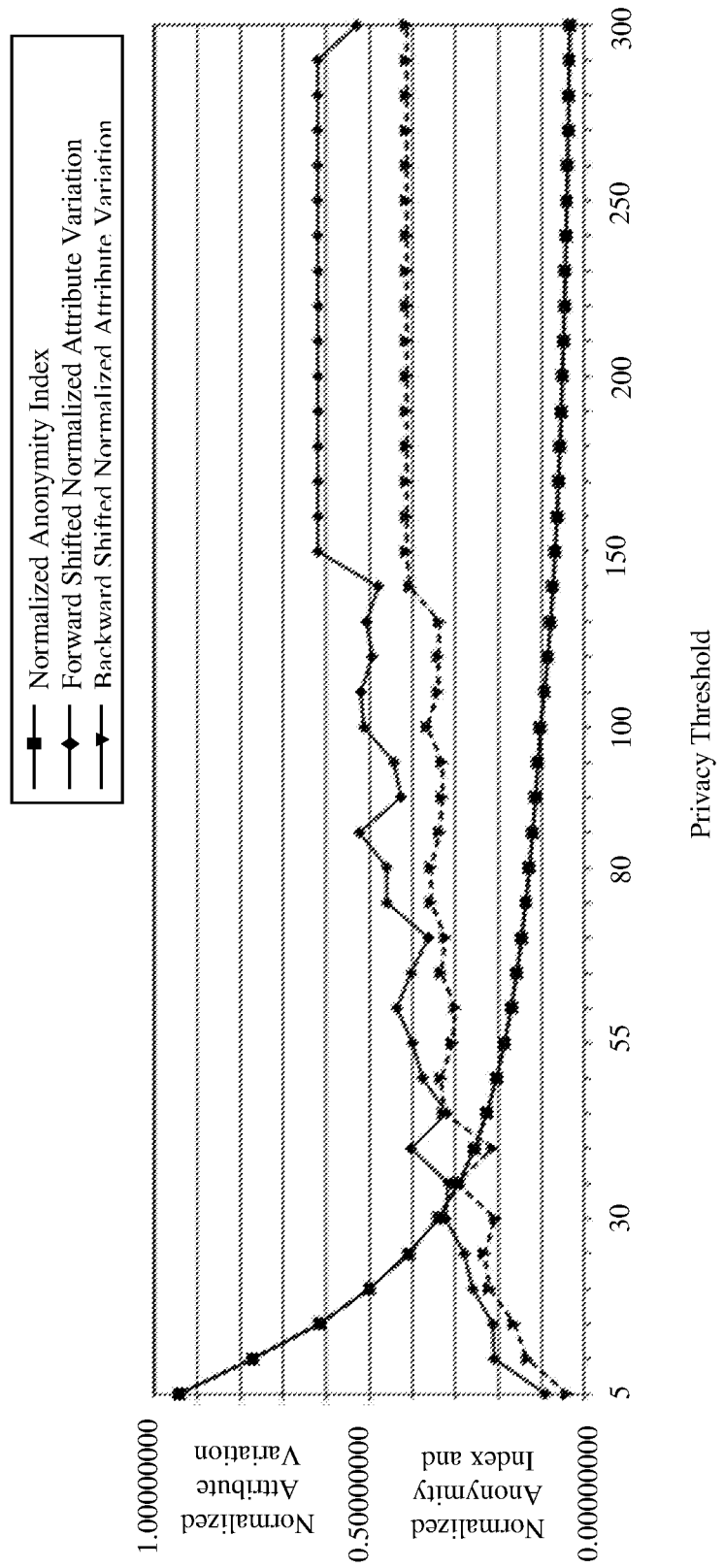
FIG. 7 is a graphical illustration of the Normalized Anonymity Index and the Normalized Attribute Variation versus privacy threshold for an exemplary set of data, in accordance with the present disclosure.

FIG. 7 is a graphical illustration of the Normalized Anonymity Index and the Normalized Attribute Variation versus privacy threshold for an exemplary set of data, in accordance with the present disclosure. It may be observed from the comparison graph of FIG. 7 that as long as privacy threshold increases, anonymity-index keeps on decreasing and attribute variation keeps on increasing.

If privacy threshold increases, anonymity index decreases, and attribute variation increases.

Figure 8:
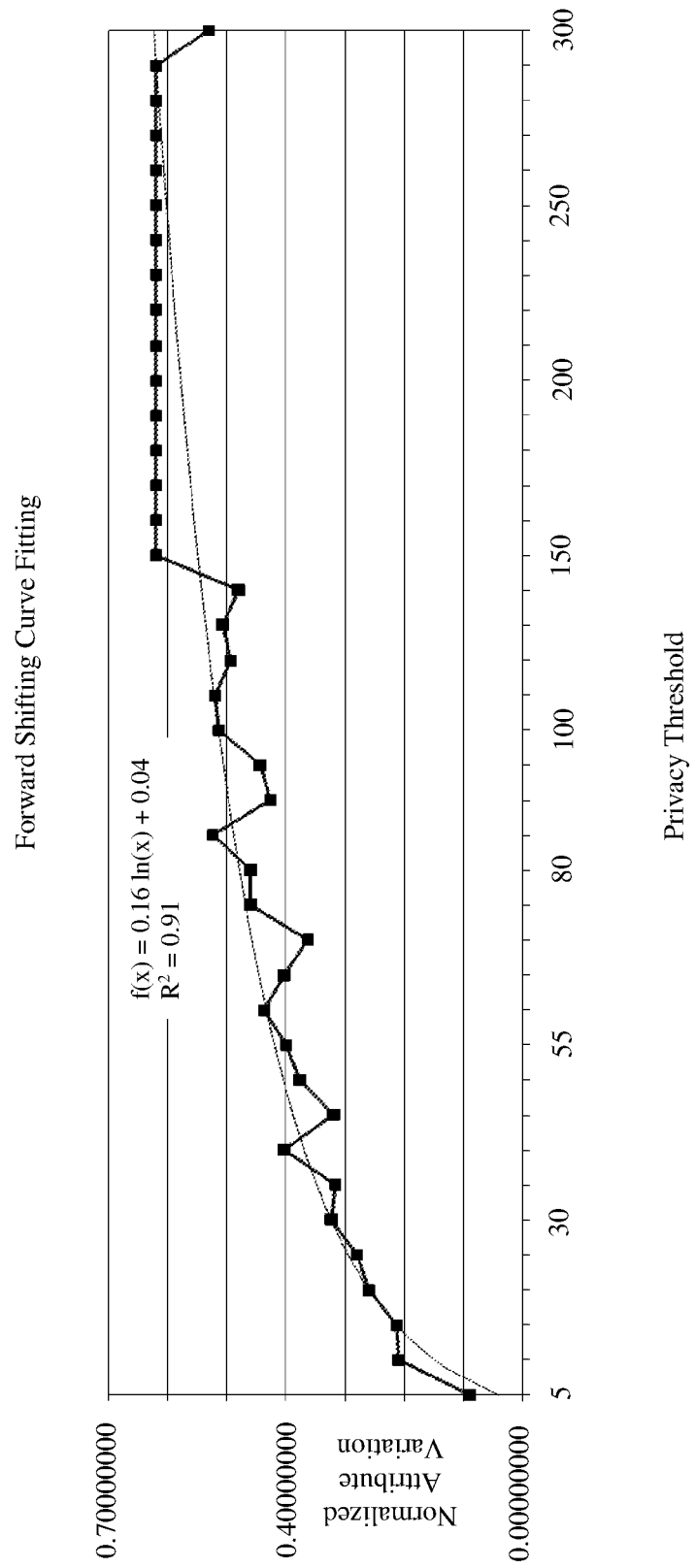
FIG. 8 is a graphical illustration of forward shifting attribute variation graph for an exemplary set of data with the help of curve fitting, in accordance with the present disclosure.
Figure 9:
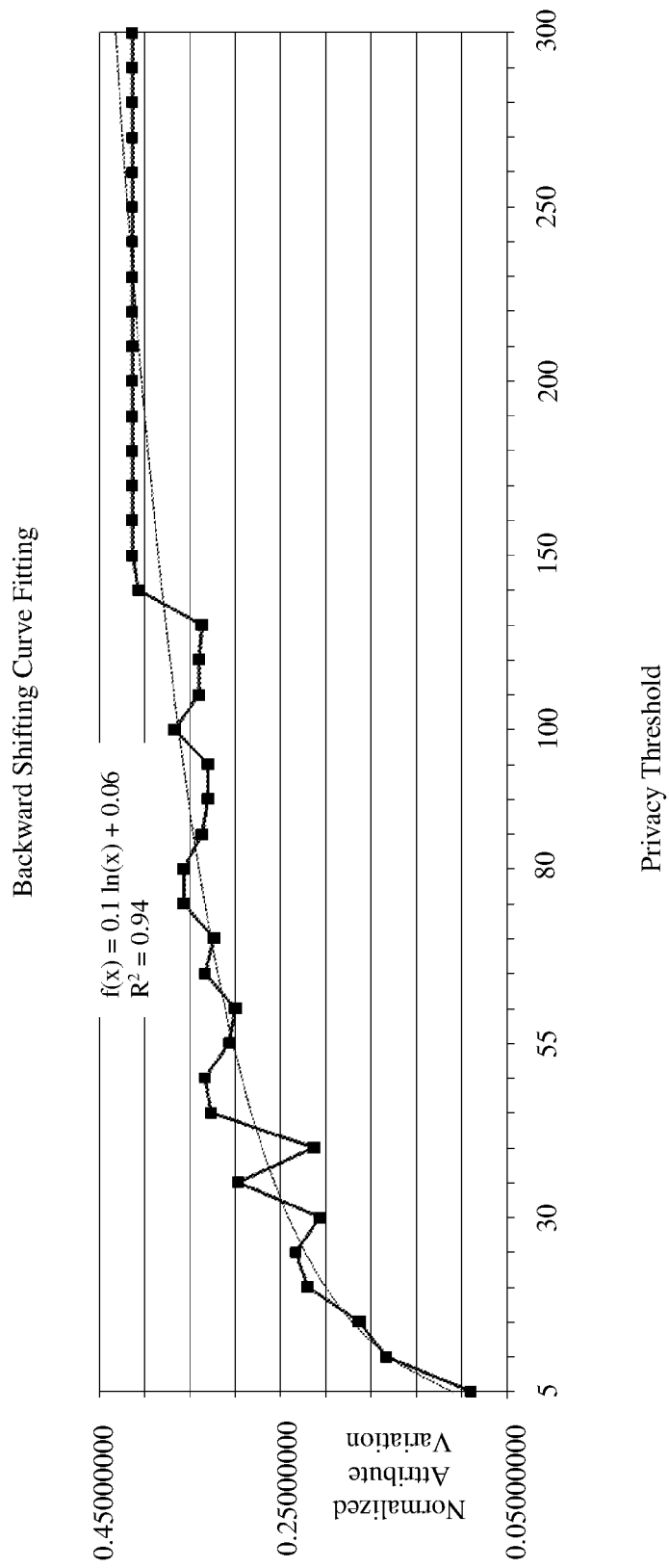
FIG. 9 is a graphical illustration of backward shifting attribute variation graph for an exemplary set of data with the help of curve fitting, in accordance with the present disclosure.

FIG. 8 is a graphical illustration of forward shifting attribute variation graph for an exemplary set of data of 300 people with the help of curve fitting, in accordance with the present disclosure; and FIG. 9 is a graphical illustration of backward shifting attribute variation graph for an exemplary set of data of 300 people with the help of curve fitting, in accordance with the present disclosure. It may be observed that $R^2$ (the coefficient of determination is a statistical measure of how well the regression line approximates the real data points) for backward shifting of attribute movement is 0.94, which is better than forward shifting of attribute movement (0.91). So based on above result, for the illustrated example dataset, it may be noted that backward shifting is superior than forward shifting. It may be noted that forward and backward shifting of attribute variation totally depends on structure of data.

In an embodiment, at step 224, the adversary model 108C continually learns and updates itself based on the received data. In an embodiment, information gathering may be done by web crawlers. Consequently these web crawlers continuously monitor public domains for any new information being made available about people, and accordingly enrich the adversary model 108C.

In an embodiment, the method 200 described herein above may further include step 226, wherein a decision helper module 108F is configured to provide recommendations to the data sellers based on the received data. The recommendations may be calculated from the data seller's preference set for similar data from the received data such as age, demographics, type of data, and the like. In an embodiment, recommendations can also depend on regulations of the domain and/or country. For instance, HIPAA (Health Information Portability and Accountability Act of USA) suggests the privacy threshold to be minimum 20,000. So, the decision helper module 108F may consider these aspects before suggesting options.

In an embodiment, the method 200 described herein above may further include step 228, wherein an outflow data analyzer 108G is configured to evaluate the output data for quality and authenticity. Before getting released, the output data is checked for validating whether the metadata that the data buyer is requesting is what the data seller is providing.

In an embodiment, the method 200 described herein above may further include step 230, wherein a data release management module 108H is configured to decide the release plan based on risk and rewards configured by data owners/sellers. In an embodiment, the data release management module 108H may also consult the decision helper module 108F and give a final decision to the end user for manual release.

At step 232, a report and alert management module 108I is configured to generate report and alerts based on the output data.

At step 234, an event logging module 108J is configured to log all events in log files associated with the output data for monitoring and evidence purposes.

Thus transformation of data based on the computed data privacy-utility tradeoff assists both data sellers and data buyers in executing a meaningful trade.

The written description describes the subject matter herein to enable any person skilled in the art to make and use the embodiments of the invention. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the invention may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as either software and/or hardware modules and may be stored in any type of non-transitory computer readable medium or other storage device. Some non-limiting examples of non-transitory computer-readable media include CDs, DVDs, BLU-RAY, flash memory, and hard disk drives.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

We claim:
1. A processor implemented method (200) comprising:
receiving, by a data connector, data from one or more data sources for making the data consumable by one or more data buyers (202);
analyzing, by an inflow data analyzer, the received data to extract and process metadata of the received data (204);
identifying, by the inflow data analyzer, a search space comprising at least one sensitive attribute from the processed metadata based on a pre-defined knowledge base associated with the data (206);
generating, by an adversary model generator, an adversary model by partitioning the search space into sets of buckets, each set corresponding to the at least one sensitive attribute having a privacy data associated thereof (208), wherein generating the adversary model comprises generating the sets of buckets based on one of (a) pre-defined ranges of values or (b) pre-defined upper and lower bounds, for each of the at least one sensitive attribute based on the pre-defined knowledge base;

computing, by the adversary model generator, bucket count for each of the sets of buckets and creating bucket combinations of the buckets from the sets of buckets (210);

replacing, by the adversary model generator, the privacy data associated with each of the at least one sensitive attribute with a masking bucket from the buckets (212);

computing, by the adversary model generator, an entity count for each of the bucket combinations based on the masking bucket assigned to the privacy data (214);

computing, by the adversary model generator, an anonymity index based on the computed entity count and a pre-defined privacy threshold (216);

sanitizing, by a data masking module, the privacy data based on the computed anonymity index to generate output data (218);

continually learning and updating the adversary model based on the received data (224);

providing recommendations, by a decision helper module, to data sellers based on the received data (226);

evaluating, by an outflow data analyzer, the output data to match requirements of the one or more data buyers (228);

determining, by a data release management module, a release plan based on the recommendations by the decision helper module (230);

generating, by a report and alert management module, evaluation reports and alerts based on the output data (232); and logging, by an event logging module, events associated with the output data (234).

2. The processor implemented method of claim 1, wherein the at least one sensitive attribute comprises one or more of binary, categorical, numerical and descriptive texts.

3. The processor implemented method of claim 1, wherein the range of values and the upper and lower bounds are computed by the inflow data analyzer based on the at least one sensitive attribute.

4. The processor implemented method of claim 1, wherein sanitizing the privacy data comprises one of (i) hierarchy masking techniques, (ii) bucket masking techniques, (iii) clustering technique or (iv) shuffling technique.

5. The processor implemented method of claim 4, wherein the shuffling technique is performed to obtain balanced buckets, wherein each bucket combination has a balanced entity count.

6. The processor implemented method of claim 5 further comprising computing, by a data privacy-utility tradeoff calculator, a utility index based on mid-point of the balanced bucket and the privacy data (220).

7. The processor implemented method of claim 6 further comprising computing, by the data privacy-utility tradeoff calculator, attribute variations based on the number of variations between the buckets and the balanced buckets (222).

8. A system (100) comprising:
one or more processors (102); and
one or more internal data storage devices (106) operatively coupled to the one or more processors (102) for storing instructions configured for execution by the one or more processors (102), the instructions being comprised in:

a data connector (108A) configured to:
receive data from one or more data sources for making the data consumable by one or more data buyers;

an inflow data analyzer (108B) configured to:
analyze the received data to extract and process metadata of the received data; and
identify a search space comprising at least one sensitive attribute from the processed metadata based on a pre-defined knowledge base associated with the data;

an adversary model generator (108C) configured to:
generate an adversary model by partitioning the search space into sets of buckets, each set corresponding to the at least one sensitive attribute having a privacy data associated thereof, wherein generating the adversary model comprises generating the sets of buckets of based on one of (a) pre-defined ranges of values or (b) pre-defined upper and lower bounds, for each of the at least one sensitive attribute based on the pre-defined knowledge base;
compute bucket count for each of the sets of buckets and creating bucket combinations of the buckets from the sets of buckets;
replace the privacy data associated with each of the at least one sensitive attribute with a masking bucket from the buckets;
compute an entity count for each of the bucket combinations based on the masking bucket assigned to the privacy data;
compute an anonymity index based on the computed entity count and a pre-defined privacy threshold; and
continually learn and update the adversary model based on the received data;

a data masking module (108D) configured to:
sanitize the privacy data based on the computed anonymity index to generate output data;

a decision helper module (108F) configured to:
provide recommendations to data sellers based on the received data;

an outflow data analyzer (108G) configured to:
evaluate the output data to match requirements of the one or more data buyers;

a data release management module (108H) configured to:
determine a release plan based on the recommendations by the decision helper module (108F);

a report and alert management module (1081) configured to:
generate evaluation reports and alerts based on the output data; and an event logging module (108J) configured to:
log events associated with the output data.

9. The system of claim 8, wherein the at least one sensitive attribute comprises one or more of binary, categorical, numerical and descriptive texts.

10. The system of claim 8, wherein the range of values and the upper and lower bounds are computed by the inflow data analyzer (108B) based on the at least one sensitive attribute.

11. The system of claim 8, wherein the data masking module (108D) is further configured to sanitize the privacy data by one of (i) hierarchy masking techniques, (ii) bucket masking techniques, (iii) clustering technique or (iv) shuffling technique.

12. The system of claim 11, wherein the shuffling technique is performed to obtain balanced buckets, wherein each bucket combination has a balanced entity count.

13. The system of claim 12 further comprising:
a data privacy-utility tradeoff calculator (108E) configured to:

compute a utility index based on mid-point of the balanced buckets and the privacy data; and compute attribute variations based on the number of variations between the buckets and the balanced buckets.

14. A computer program product comprising a non-transitory computer readable medium having a computer readable program embodied therein, wherein the computer readable program, when executed on a computing device, causes the computing device to:

receive data from one or more data sources for making the data consumable by one or more data buyers;

analyze the received data to extract and process metadata of the received data;

identify a search space comprising at least one sensitive attribute from the processed metadata based on a pre-defined knowledge base associated with the data;

generate an adversary model by partitioning the search space into sets of buckets, each set corresponding to the at least one sensitive attribute having a privacy data associated thereof, wherein generating the adversary model comprises generating the sets of buckets of based on one of (a) pre-defined ranges of values or (b) pre-defined upper and lower bounds, for each of the at least one sensitive attribute based on the pre-defined knowledge base;

compute a bucket count for each of the sets of buckets and creating bucket combinations of the buckets from the sets of buckets;

replace the privacy data associated with each of the at least one sensitive attribute with a masking bucket from the buckets;

compute an entity count for each of the bucket combinations based on the masking bucket assigned to the privacy data;

compute an anonymity index based on the computed entity count and a pre-defined privacy threshold; and sanitize the privacy data based on the computed anonymity index to generate output data and obtain balanced buckets, wherein each bucket combination has a balanced entity count;

continually learn and update the adversary model based on the received data;

provide recommendations to data sellers based on the received data;

evaluate the output data to match requirements of the one or more data buyers;

determine a release plan based on the provided recommendations;

generate evaluation reports and alerts based on the output data; and log events associated with the output data.

15. The computer program product of claim 14, wherein the computer readable program further causes the computing device to perform one or more of:

compute a utility index based on mid-point of the balanced buckets and the privacy data; and compute attribute variations based on the number of variations between the buckets and the balanced buckets.

* * * * *